Dec. 6, 1927.
R. B. GIRDWOOD-BLACKETT
1,651,693
CAR OR WAGON
Filed March 28, 1927
4 Sheets-Sheet 3
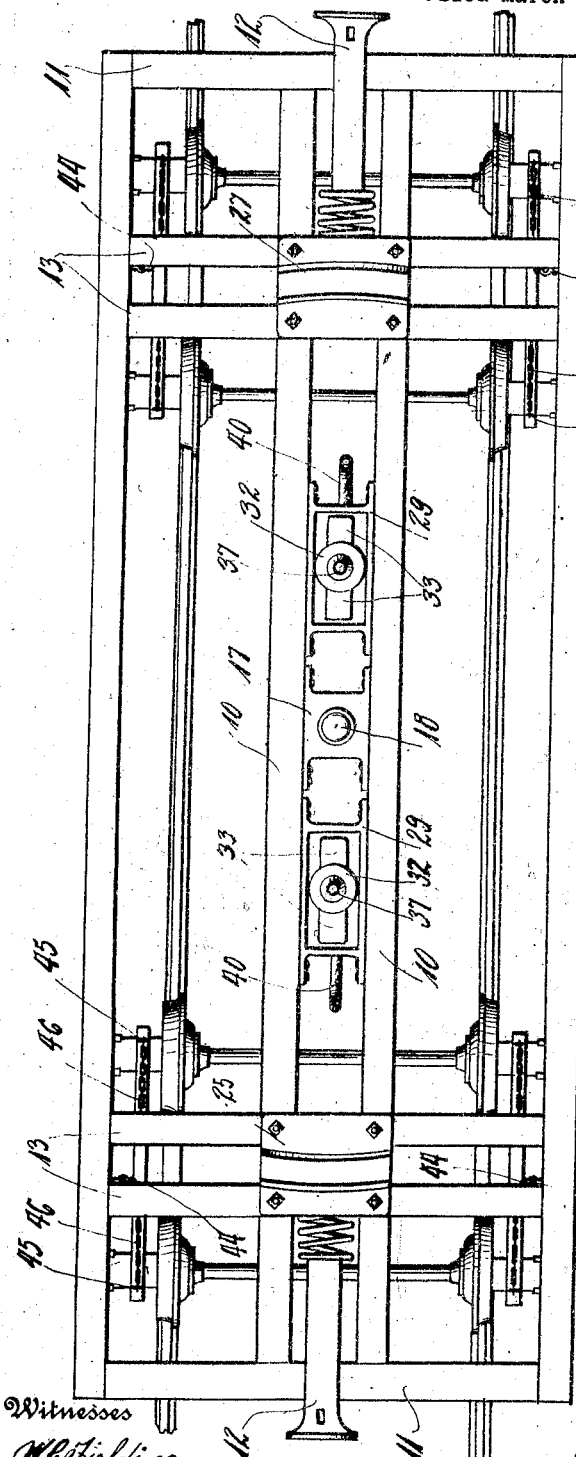

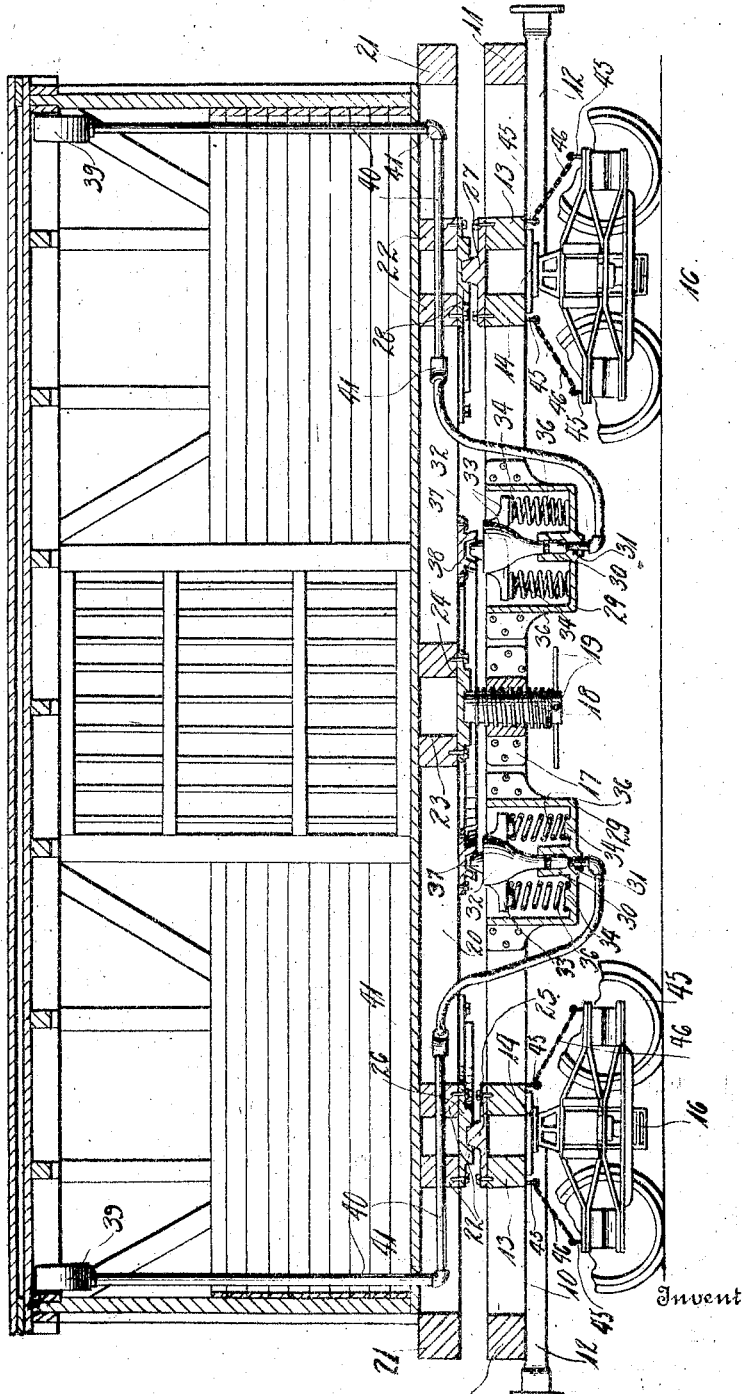

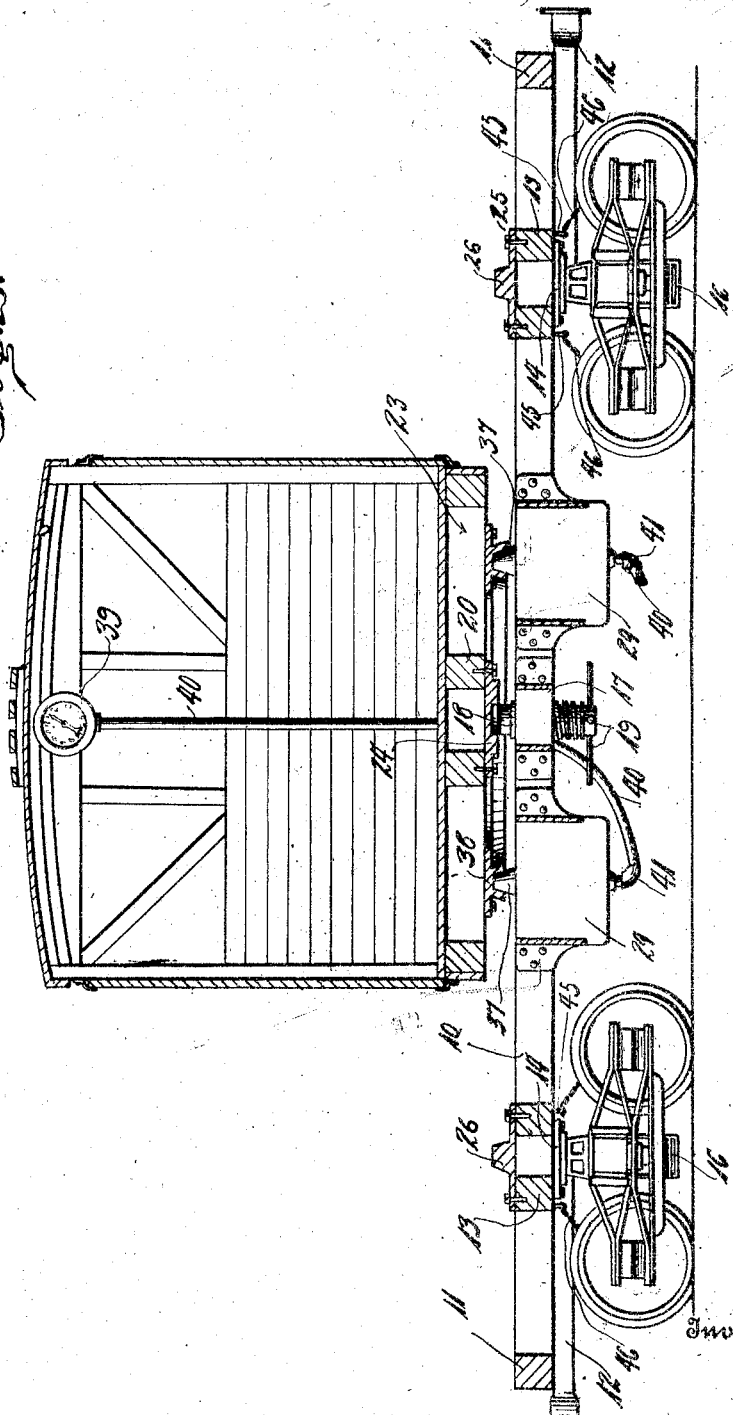

Dec. 6, 1927.
R. B. GIRDWOOD-BLACKETT
1,651,693
CAR OR WAGON
Filed March 28, 1927    4 Sheets-Sheet 4
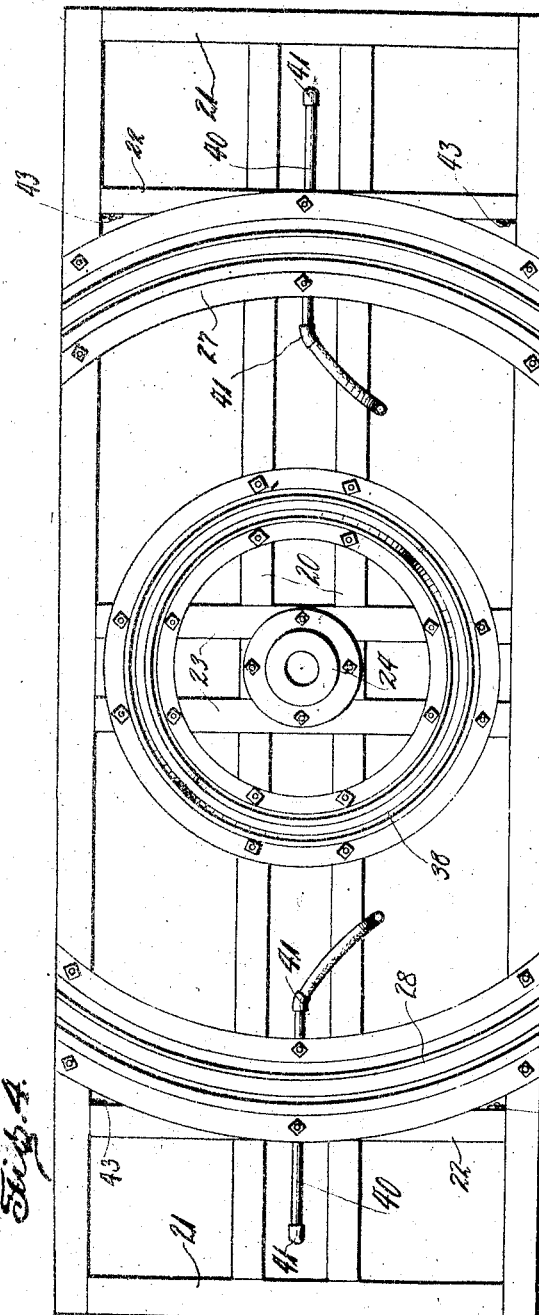
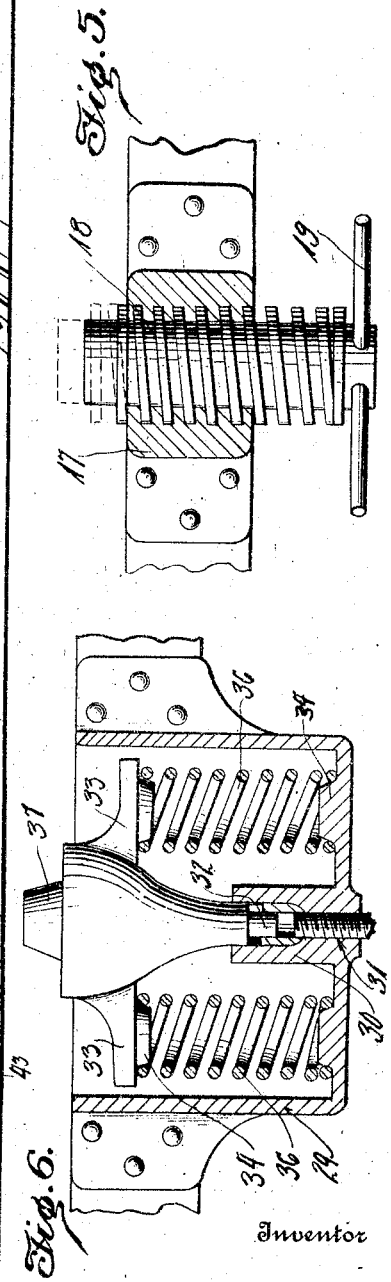

Patented Dec. 6, 1927.

1,651,693

UNITED STATES PATENT OFFICE.

ROIRDEN B. GIRDWOOD-BLACKETT, OF SANTO DOMINGO, DOMINICAN REPUBLIC.

CAR OR WAGON.

Application filed March 26, 1927. Serial No. 179,150.

This invention relates to cars or wagons with special reference to a railroad car arranged for weighing.

The principal object of the invention is to provide an improved form of railroad car or wagon which is equipped with the devices adapted to weigh the load of the car.

Another object of the invention is to provide a railroad car having a supplemental frame arranged to rotate on the main frame and take position thereon for weighing with certain devices attached to the car.

A third object of the invention is to provide, in a car of the character described, a trunk which may be either held from rotation around its center or permitted to rotate freely therearound.

A fourth object of the invention is to provide an improved weighing means for a car of the character described.

With the above and other objects in view as will become apparent hereinafter, the device consists in general of a frame supported on trucks, a second frame whereon is built a car body mounted to rotate around the center of the first mentioned or main frame, an elevating device carried at the center of the main frame arranged to raise or lower the secondary frame and car body, weighing devices supported on the main frame and an improved form of truck holding device.

The invention further consists in certain novel details of arrangement and combination of parts, hereinafter fully described, illustrated in the accompanying drawings and specifically set forth in the claims.

In the accompanying drawings, like characters of reference indicate like parts in the several views and:

Figure 1 is a side view of a car frame equipped with this invention, the view being taken mainly in section and showing a car body arranged ready for movement along a track or road.

Figure 2 is a similar view showing the parts arranged in the position taken when the car body is to be weighed.

Figure 3 is a view of the main or truck supported frame.

Figure 4 is a bottom plan view of the car body.

Figure 5 is an enlarged detail section of the elevating screw.

Figure 6 is a similar section of one of the weighing devices.

Figure 7 is a perspective view of one of the braking skids.

Figure 8 is a detail sectional view, partly in elevation, showing the means employed for locking the car to the frame.

While the invention herein shown and described has been specifically applied to a railroad car and the parts will be described as pertaining thereto, it is to be observed that by slight modifications, the same may be utilized for delivery wagons, farm wagons or like vehicles.

In the drawings appended the numeral 10 indicates one of the center sills of the lower frame. This frame is also provided with the usual end sills 11 to which center sills and end sills is attached a draft gear and coupling as indicated at 12. At 13 is shown a body bolster of any preferred type wherein is mounted the body center plate 14 which serves as the point where the truck pivots. This truck may be of any preferred construction and is preferably provided with leaf springs 16.

Located centrally of the sills 10 is a casing 17 arranged to form a pocket and securely bolted to said center sills. Mounted in this casing 17 is a screw which is preferably termed the elevating screw 18. This screw is provided at its lower end with a reduced portion having apertures therein within which is fitted a plurality of bars 19. These bars may be either permanently fitted in these apertures or the reduced portion may be made in the form of a capstan head and the bars loosely placed therein when it is desired to rotate the screw. The upper end of the screw 18 is cylindrical in form for the purposes hereinafter to be described.

Above the main frame is a supplementary frame comprising the center sills 20, end sills 21 and bolsters 22, as well as other sills and braces to make a complete frame. Between the center sills 20 and centrally located thereon is a center bolster 23 wherein is mounted a center plate 24 provided with a socket at the lower end for the reception of the end 20 of the screw 18. It will now be observed that by rotating the screw 18 the distance between the main and the supplemental frame can be varied as desired.

For the purpose of supporting the car body and the supplemental frame when the car is in running position, there is provided on the bolster 13 a bottom bearing plate 25 having an arcuate track 26 mounted thereon. In like manner, the bolster 22 is provided with a top bearing plate 27 having a grooved arcuate track 28 thereon. These castings are provided at each end of the car and are so arranged as to transmit the weight, when running directly to the trucks.

On each side of the screw 18, supported between the center sill 10 is a casting 29, securely bolted to said sill. Within this casting 29 is formed a cylinder 30 provided with a pipe threaded aperture at its lower end, said pipe threaded aperture being numbered 31. A plunger 32 is mounted in said cylinder and the cylinder serves to guide said plunger as well as for other purposes to be hereinafter described. This plunger 32 is provided with a pair of arms 33 laterally disposed and preferably oppositely situated. On each of the arms 33 is formed a spring seat 34 and in alignment therewith on the bottom of the casting 29 is formed a similar spring seat. Between each of these spring seats is provided a weighing spring 36. These weighing springs are carefully adjusted for the weight of the car and load so that a definite deflection of the springs will indicate a definite load in the car. The upper end of the plunger 32 is provided with a head 37 preferably of a sub-acute V-shape. Upon the center sill 20 is held an arcuate bearing member 38 adapted when the car is in weighing position to contact with the head 37. Mounted in any desirable position within the car, so that the conductor or motorman may readily observe same, is a weighing gauge 39, preferably of the Bourdon type. These gauges are preferably mounted at the end of the end of the car and they may be separately connected to the different cylinders 30 to indicate weight brought upon the springs 36 of the castings 29. These gauges 39 are connected to the cylinders 30 by means of pipes 40 provided with joints 41, so that when the car is revolved the connection may not be broken.

In the operation of the device thus far described, let it be assumed that the car is in the position indicated in Figure 1 and that it is loaded. If it be desired to ascertain the weight of the loaded car, the secondary frame is raised by actuating the screw 18 in the proper direction, and the body rotated on its central axis, which brings the body into the position shown in Figure 2. The motion of the screw 18 is then reversed and the car allowed to come down upon the plunger head 37. The pressure of the fluid contained in the cylinder 30 is then transmitted to the gauges 39 and the weight of the car recorded thereon. The operation is then reversed and the car brought back to its running position as indicated in Figure 1.

In order to provide means for securely locking the car in its running position, suitable bolts, preferably four in number, are held at 42 in castings 43. These castings are preferably located at each end of the bolsters 22 and upon the bolsters 13 are provided similar castings 44 adapted to receive the ends of the bolts 42 when the same are in registry therewith. These bolts preferably extend to such a position as may be readily operated from the interior of the car.

Each of the trucks 15 is provided with a pair of eye-bolts 45 and upon the bottom of the frame are carried chains 46 having hooks at their ends to engage the eye-bolts 45. By this means, the trucks are prevented from rotating with reference to the lower frame while, at the same time, the hooks can be disengaged from the eye-bolts and the trucks permitted to rotate to any desired position.

In order to provide means for holding the wheels from rotation and preventing the wear due to the friction of same on the rails or road when held by the brakes, there are carried by the lower frame chains 47 which are equipped at their outer ends with drags or clogs 48 of suitable form to receive the periphery or rim of the wheels and to permit the wheels to rest thereon instead of on the ground. When it is desired to prevent the wheels from rotating, these drags or clogs are simply positioned in front of said wheels and the wheels are allowed to run up thereon. The drags or clogs will then interpose between the road and the motion of the car will be a sliding motion rather than a rolling one.

There has thus been provided a new and efficient device of the character described and for the purposes specified. It is not desired to confine the invention to the exact form shown herein and described, but, as many minor changes may be made in the form and proportions thereof without departing from the material principles, it is desired to include all such as properly come within the scope of the invention.

What is claimed is:

1. In a device of the kind described, a pair of trucks, a frame supported thereon, a car body revolvably mounted on said frame, a screw arranged to form a pivot for said car body, means for actuating said screw to raise the body, weighing means for the body supported on said frame, and other means carried on said frame to support a car body when in alignment with the frame and in lowered position.

2. In a device of the kind described, a pair of trucks, a frame supported thereon, a car body revolvably mounted on said frame, an elevating screw supported on said frame and arranged to form a pivot for said car body, said elevating screw being adapted to vary the distance between said car body and said frame, weighing means including registering means respectively connected to the frame and the body, other means carried by said frame to support a car body when in alignment with the frame and in lowered position and releasable locking devices to hold said car body in alignment with the frame.

3. In a device of the kind described, a pair of trucks, a frame supported thereon, a car body revolvably mounted on said frame, elevating means to vary the distance between said car body and said frame, weighing means including registering means respectively connected to the frame and the body, said registering means including fluid pressure cylinders and fluid pressure gauges, and other means carried on said frame to support the car body, when in alignment with the frame.

4. In a device of the kind described, a pair of trucks, a frame supported thereon, a car body revolvably mounted on said frame, an elevating screw supported on said frame to vary the distance between the car body and the frame and arranged to form a pivot for said body, a casting secured to the frame and including a cylinder, said cylinder being formed at its lower end with a pipe threaded aperture, a plunger mounted in the cylinder, springs disposed between the casting and the plunger, a head carried by the plunger and normally projecting above the frame and adapted to be engaged by the body to actuate the plunger, a fluid pressure gauge carried by the body and a pipe having one end connected to the gauge and the other end disposed within the pipe to receive the aperture of the casting.

In testimony whereof, I affix my signature.

ROIRDEN B. GIRDWOOD-BLACKETT.